US011429939B1

(12) United States Patent
Borunda et al.

(10) Patent No.: US 11,429,939 B1
(45) Date of Patent: Aug. 30, 2022

(54) AUTHENTICATION IN A VIRTUAL REALITY ENVIRONMENT

(71) Applicant: UIPCO, LLC, San Antonio, TX (US)

(72) Inventors: Adrian Borunda, Celina, TX (US); Richard Tanner, McKinney, TX (US); Jeffrey Joseph Szcinski, Frisco, TX (US); Cale Riley Spratt, Plano, TX (US); Jerry Allen Phelps, Dallas, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 279 days.

(21) Appl. No.: 16/152,210

(22) Filed: Oct. 4, 2018

Related U.S. Application Data

(60) Provisional application No. 62/569,329, filed on Oct. 6, 2017.

(51) Int. Cl.
*G06Q 40/00* (2012.01)
*G06Q 20/10* (2012.01)
*G06Q 40/02* (2012.01)
*G06F 21/32* (2013.01)
*H04L 9/32* (2006.01)
*G06T 19/00* (2011.01)

(52) U.S. Cl.
CPC ............ *G06Q 20/10* (2013.01); *G06F 21/32* (2013.01); *G06Q 40/02* (2013.01); *G06T 19/006* (2013.01); *H04L 9/3213* (2013.01)

(58) Field of Classification Search
CPC ......... G06Q 40/00; G06F 21/32; G06F 21/30; H04L 9/0838
USPC .......................................................... 705/39
See application file for complete search history.

(56) References Cited

U.S. PATENT DOCUMENTS

2017/0346851 A1* 11/2017 Drake .................. H04L 9/0838

* cited by examiner

*Primary Examiner* — Ojo O Oyebisi
(74) *Attorney, Agent, or Firm* — Perkins Coie LLP (57) ABSTRACT

This disclosure provides methods and systems for performing authentication in a virtual reality environment. In some implementations, the system receives a request for access to a virtual reality financial center requiring authentication from a user. The system can collect user identification information that identifies the user and verification information required to verify the user's identity via a virtual reality platform.

20 Claims, 5 Drawing Sheets

AUTHENTICATION IN A VIRTUAL REALITY ENVIRONMENT

CROSS-REFERENCE TO RELATED APPLICATIONS

This application is a non-provisional of and claims priority to U.S. Provisional Application No. 62/569,329, filed Oct. 6, 2017, entitled "AUTHENTICATION METHODS AND SYSTEMS IN A VIRTUAL REALITY ENVIRONMENT," which is hereby incorporated by reference in its entirety for all purposes.

BACKGROUND

Virtual reality can simulate a user's physical presence in a virtual environment. Some virtual environments require authentication before access is provided to the user.

BRIEF DESCRIPTION OF THE DRAWINGS

Embodiments of the present disclosure will be described and explained through the use of the accompanying drawings, in which.

DETAILED DESCRIPTION

Various embodiments of the present disclosure generally relate to authentication. More specifically, various embodiments of the present disclosure relate to authentication methods and systems in a virtual reality environment. Some virtual reality environments are specific to a user such that the user must identify herself, and, in some cases, provide information to verify the user's identity to access the virtual reality environment. Examples of virtual reality environments that can require authentication (i.e., provide identification and verification of the identification) include virtual reality environments related to the user's finances (e.g., a virtual reality financial center), health, family, and home.

Providing the authentication credentials via the virtual reality environment may compromise the user's information. That is, if the user provides the authentication credentials via a virtual reality environment, other users may actually see the credentials or obtain clues that may allow them to determine the credentials. For example, depending on the virtual reality system being used, the contents of the virtual reality headset can be sent to an external device (e.g., mirrored to a screen) so that others can see what is happening in the virtual reality environment. Thus, credentials may be seen by others.

Even if the capability to stream the virtual reality session to other devices is turned off while the user provides authentication credentials, others may obtain clues to the user's authentication credentials by watching the user's movements. For example, if the user is providing the user's personal identification number (PIN) by rearranging die so that the faces of the die display the user's PIN, a person who is watching the user's virtual reality session could watch the user's movements and mimic how the user is moving the die to gain access.

Embodiments described herein provide authentication methods and systems in a virtual reality environment. Two-factor authentication may be used. That is, to access the virtual reality environment, the user must provide two of the following three factors: something the user knows (e.g., PIN, password, answers to personal questions), something the user has (e.g., a mobile device, a pager), or something the user is (e.g., biometric information such as a fingerprint, hair sample).

In some embodiments, to authenticate the user, the system can collect identification information. The identification information may be collected without requiring the user to interact with the system. Some identification information may further provide verification information. For example, the system can collect a token from the user's mobile device (e.g., from a mobile application installed on the mobile device). The token can provide both identification and verification (i.e., something the user has—mobile device). In other embodiments, the user can provide an identifier such as a login name or member number to the virtual reality platform.

After the user is identified, the system can determine what type(s) of verification the user should provide. The type of verification can vary based on various factors such as user preferences, the type of authentication provided previously, a level of authentication needed for the virtual reality session, or any authentication level built into the system handling the virtual reality session (i.e., public domain, private domain, registered). The user can then be asked to provide verification of the user's identity via the virtual reality environment. In some embodiments, the user is asked to provide two-factor authentication and thus provide two different types of verification. Verification information can include proof of something the user is such as biometric information (e.g., an image of the user's hand or face received via a camera integrated with a headset associated with the virtual reality system). Verification information can further include proof of something the user has such as a mobile device (e.g., a token or code from the phone, location of the mobile device). A third type of verification information can be something that the user knows (e.g., password, PIN, answers to security questions).

In some embodiments, the virtual reality platform can display objects (e.g., die, pictures) for the user to select or arrange within the virtual reality environment. If the user selects or arranges the objects correctly (e.g., according to a pre-established PIN or code sent to the user), the user can be authenticated and allowed access to the virtual reality session. In some embodiments, the objects are die and the display of the faces is randomized. The user may be asked to arrange the die to display a PIN or code. The PIN may be the user's typical PIN to access a web portal or mobile application. Prior to the objects being displayed, the virtual reality platform can randomize the display so that a person watching the user cannot mimic the user's movements and gain access to the user's virtual reality session. Alternatively, a dynamic code can be used. For example, the PIN or code can be generated by the virtual reality platform and sent to the user's mobile device.

In some embodiments, the user's identity can be further verified using a location of the user's mobile device, peer-to-peer configurations the user has on a mobile device (i.e. BLE keychain passing), direct input from the user, system configurations of the machine operating the virtual reality session, or third party applications broadcasting user collected preferences (i.e. apps collecting location, check-in through Yelp).

After the user is authenticated, the user can access the virtual reality environment. The virtual reality environment can be a virtual reality financial center where the user can, for example, view accounts, make transactions, perform financial planning, and pay bills. In some embodiments, the user's accounts are represented visually. For example, the user's accounts could be stacks of currency, precious metals or other representation of funds so the user can see relatively how much money is in each account. The accounts can be arranged in chests such that when the user opens the account the user can see the currency or precious metals. In some embodiments, the user can initiate transactions in the virtual reality environment. For example, the user can transfer money from one account to another via the virtual reality platform by picking up some or all of the currency or precious metals from one stack to another stack. The amount that is moved from one chest to another is validated between the transacting accounts where a valid transfer is initiated to a service available to the system. All sensitive business transactions can be stored and batched to the receiving service if a data connection is not available to the session. All transactions propagated through the data connection receives a response describing the status of the action. The user can also pay bills via the virtual reality environment, make investments or withdraw cash (the user would be sent a location to collect the cash).

In some embodiments, in the virtual reality environment, the user can visualize the user's retirement by seeing a timeline represented in stacks of currency or precious metals. The user can see how the user's retirement grows and can move money to various places on the timeline to visualize how the user's retirement grows depending on when the money is invested. The user could also use the virtual reality environment to build or view a budget. The user could be assisted with retirement advice from a virtual assistance that guides visual retirement scenarios such as fund distribution across potential retirement years. Gamification can be added to retirement planning (e.g., points-based progress, brokerage discounts, retirement loans) for advice and programs can be completed in the virtual reality domain.

This disclosure describes authentication systems and methods designed to increase security when authenticating to a virtual reality environment, and more particularly to a virtual reality financial center. Various embodiments may provide one or more of the following technological improvements: (1) improved security in authenticating users to virtual reality environments that are adaptable to multiple channels; (2) decreased communications between the user, client and server to authenticate the user to virtual reality environments; and (3) real-time or near real-time transactions via a virtual reality environment.

In the following description, numerous specific details are set forth to provide a thorough understanding of embodiments of the present disclosure. However, it will be apparent to one skilled in the art upon reading the disclosure that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical discs, read-only memories (ROMs), random-access memories (RAMs), erasable programmable read-only memories (EPROMs), electrically erasable programmable read-only memories (EEPROMs), magnetic or optical cards, flash memory, or other types of machine-readable media suitable for storing electronic instructions.

Figure 1:
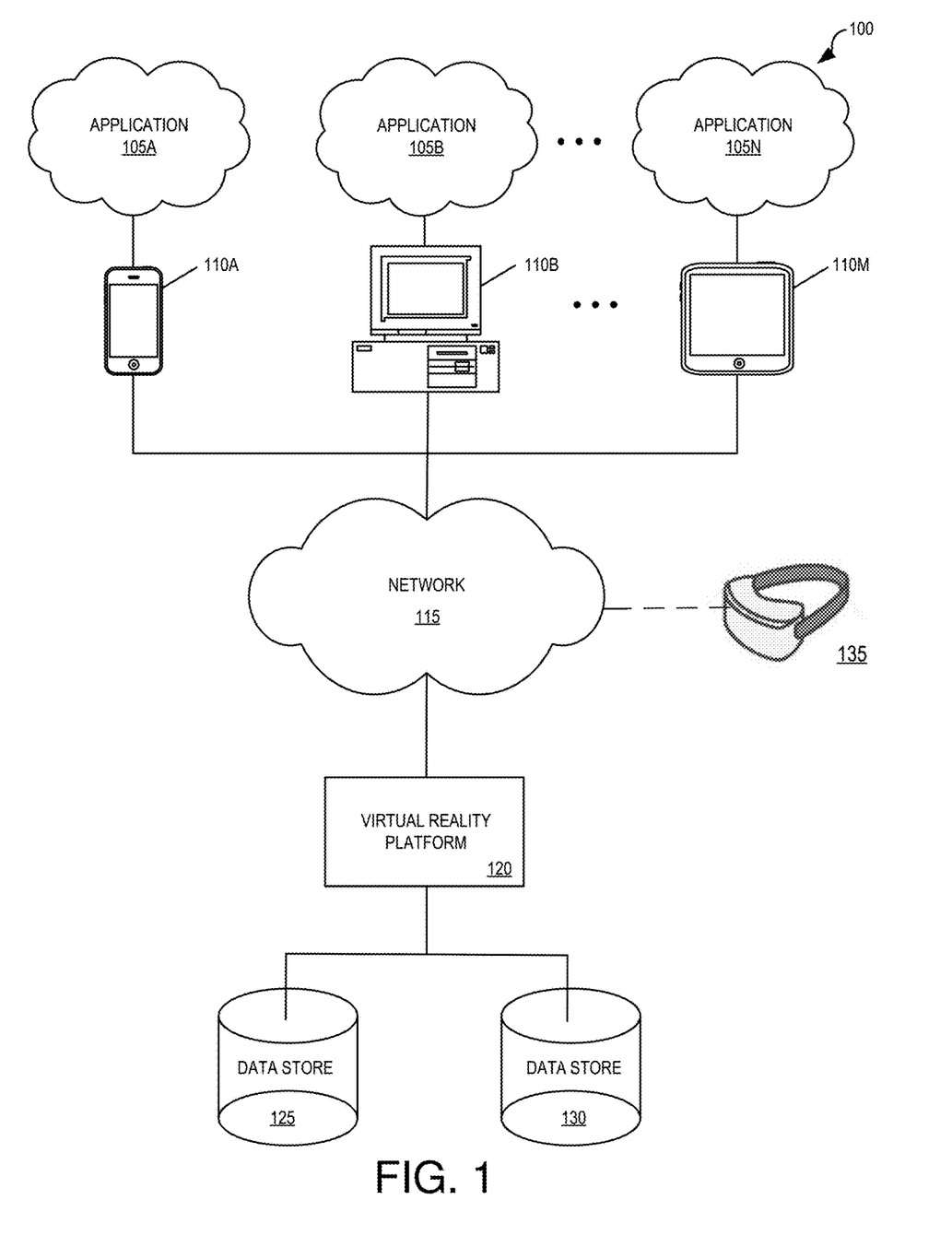
FIG. 1 illustrates an example of a network-based operating environment in accordance with various embodiments of the present disclosure.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device; a mobile phone; a telephone; a tablet computer; a mobile media device; a mobile gaming device; a vehicle-based computer; a dedicated terminal; a public terminal, desktop, or laptop computer; a kiosk; wearable devices such as a smartwatch; etc.). In some embodiments, applications 105A-105N may be stored on one or more computing devices 110A-110M or may be stored remotely on a server (in the "cloud"). These computing devices can include mechanisms for receiving and sending traffic by connecting through network 115 to virtual reality device 135, virtual reality platform 120, and data stores 125 and 130.

Computing devices 110A-110M may be configured to communicate via network 115 with virtual reality platform 120. In some embodiments, computing devices 110A-110M can retrieve or submit information to virtual reality platform 120 and run one or more applications with customized content retrieved by virtual reality platform 120 and data stores 125 and 130. For example, computing devices 110A-110M can execute a browser application or a customized client to enable interaction between the computing devices 110A-110M, virtual reality platform 120, and data stores 125 and 130.

Network 115 can be any combination of local area and/or wide area networks using wired and/or wireless communication systems. Network 115 can be or could use any one or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), user datagram protocol (UDP), hypertext transport protocol (HTTP), simple mail transfer protocol (SMTP), and file transfer protocol (FTP). Data exchanged over network 115 may be represented using technologies, languages, and/or formats including hypertext markup language (HTML), or extensible markup language (XML). In addition, all or some links can be encrypted using conventional encryption technologies such as secure sockets layer (SSL), transport layer security (TLS), and Internet Protocol Security (IPSec).

Virtual reality platform 120 can run on one or more servers and can be used to provide a virtual reality financial center so that users can view financial information, perform transactions and plan for retirement. Virtual reality platform 120 can request identification credentials, collect identification information, determine what type of verification information is required/preferred, design verification procedures for the user, collect the verification information, authenticate the user, communicate with third parties, store profiles and/or policies in data stores 125 and 130, and/or perform other activities. In some embodiments, virtual reality platform 120 includes various data processing and analytic tools that allow it to determine the type of verification to authenticate the user. In some embodiments, virtual reality platform 120 is a server.

Virtual reality platform 120 may be communicably coupled with virtual reality device 135, data stores 125 and 130, and computing devices 110A-110M, and may communicate, access, or receive data (e.g., device information, authentication information) from virtual reality device 135, computing devices 110A-110M, and data stores 125 and 130. Virtual reality platform 120 may be associated with a membership organization (e.g., a financial institution or an insurance company), and the users may be members of the membership organization.

Virtual reality platform 120 may be customized or calibrated by individual companies or service providers based on user needs and/or business objectives. For example, companies may have different business rules, transaction procedures and/or authentication procedures.

Data stores 125 and 130 can be used to manage storage and access to user data such as user profiles, account information, user preferences, registered devices, location information, previous transactions, and security questions and answers. Data stores 125 and 130 may be data repositories of a set of integrated objects that are modeled using classes defined in database schemas. Data stores 125 and 130 may further include flat files that can store data. Virtual reality platform 120 and/or other servers may collect and/or access data from data stores 125 and 130.

Virtual reality device 135 can be a dedicated virtual reality console, or a programmable virtual reality device such as a headset. Virtual reality platform 120 and/or virtual reality device 135 can receive requests for a virtual financial experience. These requests can be sent by one or more computing devices 110A-110M running applications 105A-105N. For example, a mobile application can request that a user be authenticated to view their financial information in a virtual reality environment and such a request can be communicated to virtual reality device 135 and/or virtual reality platform 120. In some embodiments, a remote server communicates directly with virtual reality platform 120 and/or virtual reality device 135 to provide information, images, and/or instructions.

Figure 2:
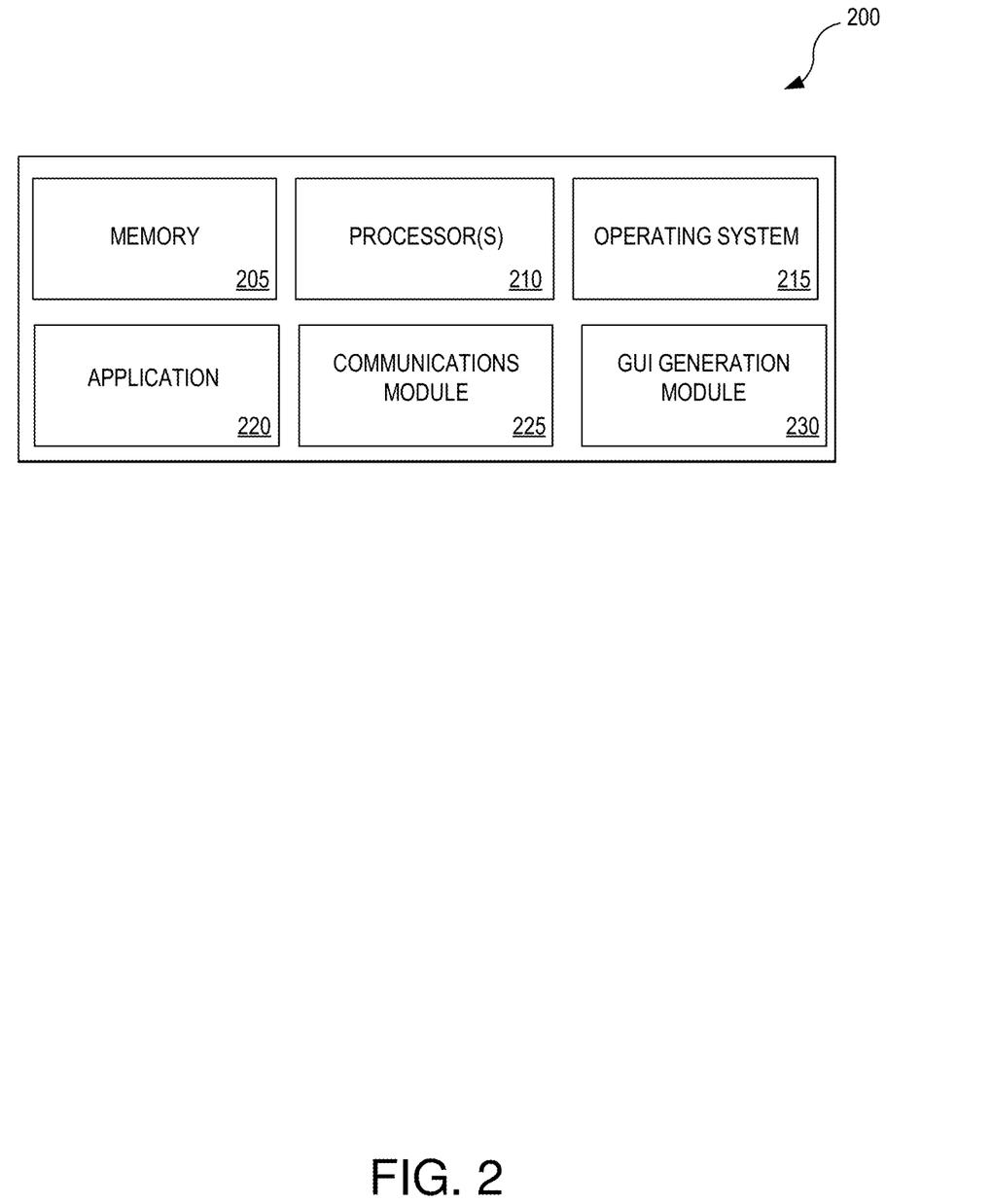
FIG. 2 illustrates various components of a computing device that may be used in accordance with one or more embodiments of the present disclosure.

FIG. 2 illustrates a set of components 200 within computing device 110 according to one or more embodiments of the present disclosure. According to the embodiments shown in FIG. 2, computing device 110 can include memory 205, one or more processors 210, operating system 215, application 220, communications module 225, and graphical user interface (GUI) generation module 230. Other embodiments of the present disclosure may include some, all, or none of these modules and components, along with other modules, applications, and/or components. Still yet, some embodiments may incorporate two or more of these modules and components into a single module and/or associate a portion of the functionality of one or more of these modules with a different module. For example, in one embodiment, application 220 and communications module 225 can be combined into a single component.

Memory 205 can be any device, mechanism, or populated data structure used for storing information. In accordance with some embodiments of the present disclosure, memory 205 can encompass, but is not limited to, any type of volatile memory, nonvolatile memory, or dynamic memory. For example, memory 205 can be random-access memory (RAM), memory storage devices, optical memory devices, magnetic media, floppy disks, magnetic tapes, hard drives, single inline memory modules (SIMMs), synchronous dynamic random-access memory (SDRAM), dual inline memory modules (DIMMs), Rambus dynamic random-access memory (RDRAM), double data rate random-access memory (DDR RAM), small outline dual inline memory modules (SODIMMs), EPROM, EEPROM, compact discs, DVDs, and/or the like. In accordance with some embodiments, memory 205 may include one or more disk drives or flash drives; one or more databases; one or more tables; or one or more files, local cache memories, processor cache memories, relational databases, flat databases; and/or the like. In addition, those of ordinary skill in the art will appreciate many additional devices and techniques for storing information that can be used as memory 205.

Memory 205 may be used to store instructions for running one or more applications or modules on processor(s) 210. For example, memory 205 could be used in one or more embodiments to house all or some of the instructions needed to execute the functionality of operating system 215, application 220, communications module 225, and GUI generation module 230.

Operating system 215 can provide a software package that is capable of managing the hardware resources of computing device 110. Operating system 215 can also provide common services for software applications running on processor(s) 210. In accordance with various embodiments, operating system 215 can coordinate resources for multiple applications 220 that allow a user to access and interact with virtual reality platform 120. For example, application 220 can include an application for a financial service application, a money transfer application, a social networking application, and a gaming application.

Application 220 can access a server and/or a platform associated with an organization (e.g., virtual reality platform 120) to provide identification or verification data, display authentication requests and confirmations, receive transaction requests, and collect account information. For example, application 220 may receive a request to provide a token to virtual reality platform 120 to identify the user. Application 220 may further receive a code or other verification information the user can provide to virtual reality platform 120 or an enterprise server to provide additional credentials.

Communications module 225 can communicate with a third party (e.g., virtual reality device 135) and/or a server (e.g., virtual reality platform 120). For example, communications module 225 can receive requests from application 220 and communicate the requests to the appropriate party, as well as receive responses to the requests.

GUI generation module 230 can generate one or more GUI screens that allow for interaction with a user. In at least one embodiment, GUI generation module 230 generates a graphical user interface receiving and/or conveying information to the user. For example, the GUI generation module 230 may display an authentication request or a notification or confirmation that a token has been sent.

Figure 3:
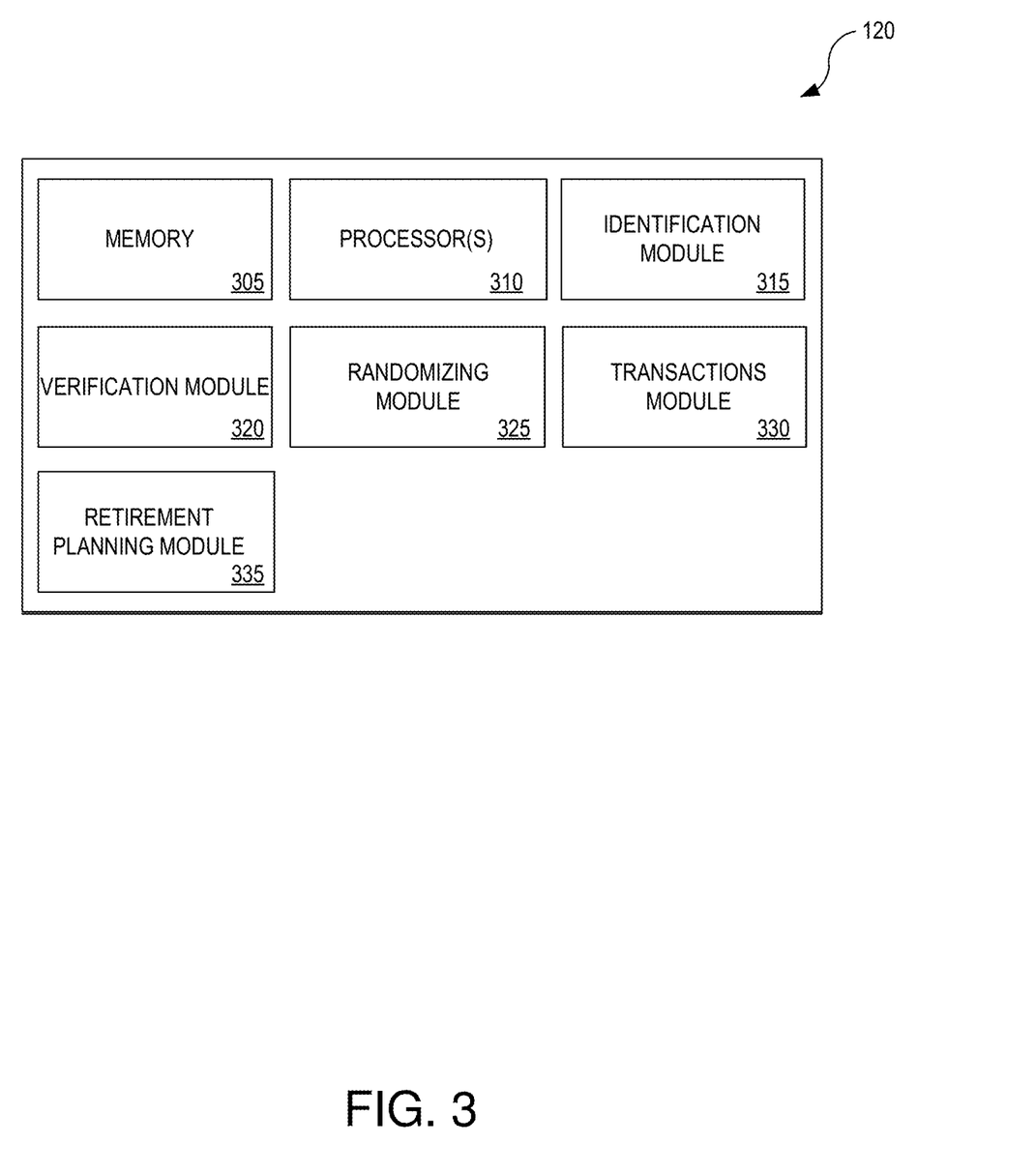
FIG. 3 illustrates various components of a virtual reality platform that may be used in accordance with various embodiments of the present disclosure.

FIG. 3 illustrates a set of components within virtual reality platform 120 according to one or more embodiments of the present disclosure. According to the embodiments shown in FIG. 3, virtual reality platform 120 can include memory 305, one or more processors 310, identification module 315, verification module 320, randomizing module 325, transactions module 330, and retirement planning module 335. Other embodiments of the present disclosure may include some, all, or none of these modules and components, along with other modules, applications, and/or components. Still yet, some embodiments may incorporate two or more of these modules and components into a single module and/or associate a portion of the functionality of one or more of these modules with a different module.

Memory 305 can be any device, mechanism, or populated data structure used for storing information as described above for memory 205. Memory 305 may be used to store instructions for running one or more applications or modules on processor(s) 310. For example, memory 305 could be used in one or more embodiments to house all or some of the instructions needed to execute the functionality of identification module 315, verification module 320, randomizing module 325, transactions module 330, and retirement planning module 335.

Identification module 315 receives or collects identification information from a user or user device identifying the user. Identification information can be a token received from the user device, a login name or user identifier, biometric information, among other identifiers. In some embodiments, identification information is biometric information received via a camera integrated with a headset associated with the virtual reality platform. In some embodiments, the identification information can be received or collected from a user device without any interaction from the user. For example, the user may send a token via a near field communication protocol such as Bluetooth.

Verification module 320 verifies the user's identity. The verification information needed to verify the user's identity can be determined by the user's preferences or a level of authentication required for activities the user will perform. In some embodiments, verification information is received at least in part with the identification information. The verification can occur within the virtual reality environment. For example, the user may be asked to arrange or select certain objects in the virtual reality environment. The objects can be one or more die and the user can arrange the die to show the user's PIN or other pre-established credential. The credential can be the PIN or passcode used to authenticate the user to a website or to a mobile application. In some embodiments, a code is sent to the user via the user's mobile device. If the user arranges the die correctly, the user's identity can be verified. In some embodiments, additional verification procedures may be used such as verifying that the user's mobile device is in the same or similar location as the user or requesting biometric information.

Randomizing module 325 can randomize the appearance of the objects in the virtual reality environment prior to the user selection or arrangement of the objects. For example, if the objects are die, the faces of the die shown to the user may be randomized prior to the user arranging the die. Randomizing the appearance of the objects ensures that onlookers will not be able to obtain the user's verification information.

Transactions module 330 allows the user to perform transactions via a virtual reality financial center after the user has been authenticated. Transactions module 330 can show the user the user's accounts in stacks of currency or precious metals (or other representation). The user can move the currency from one stack to another stack in the virtual reality financial center to pay bills, transfer money, make investments, or perform other transactions.

Retirement planning module 335 allows the user to see via the virtual reality financial center the user's retirement savings on a timeline. The user can see the time value of money by moving money from one part of the timeline to another and watching future earnings shrink or grow based on where the user places the money.

Figure 4:
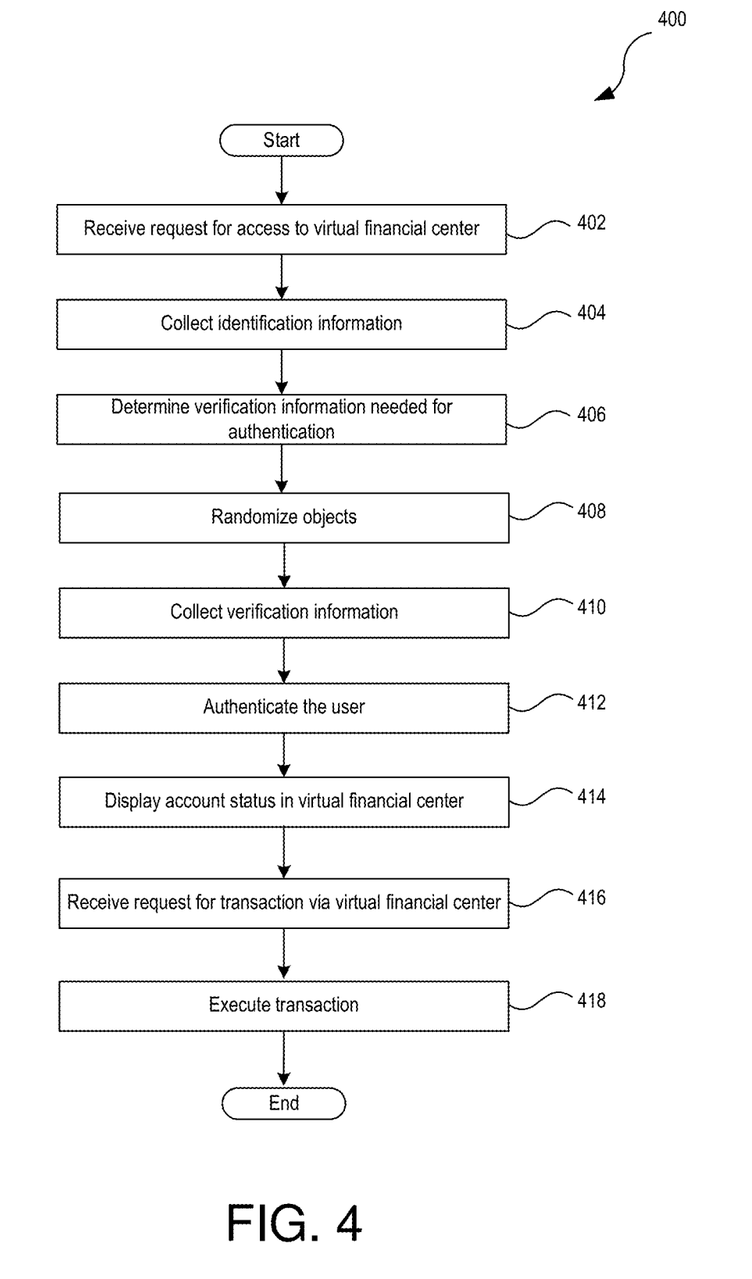
FIG. 4 is a flowchart illustrating a set of operations for authenticating a user to a virtual reality financial center in accordance with various embodiments of the present disclosure.

FIG. 4 is a flowchart illustrating sets of operations 400 for authenticating a user to a virtual reality environment such as a virtual reality financial center. In some embodiments, fewer than all of the operations in each set of operations are performed, whereas in other embodiments additional operations are performed. Moreover, in some embodiments, the operations may be performed in different orders or in parallel. The operations can be performed by components 200 of computing device 110 illustrated in FIG. 2, by virtual reality device 135, and/or by various components of virtual reality platform 120 illustrated in FIG. 3.

Receiving operation 402 receives a request for access to a virtual reality financial center. Collecting operation 404 collects identification information from the user or from the user's device. Determining operation 406 determines what verification information is necessary to authenticate the user to fulfill authentication requirements (e.g., arrangement or selection of objects). Randomizing operation randomizes the objects used to verify the user's identity. The system may further disallow sharing of the virtual reality session externally during the authentication procedure. Collecting operation 410 collects the verification information the user provides via the virtual reality financial center. Authenticating operation 412 authenticates the user to the virtual reality financial center. Displaying operation 414 displays the user's account status in the virtual reality financial center. Receiving operation 416 receives a request for a transaction via the virtual reality financial center (e.g., the user moves money from one stack/account to another stack/account, the user places money into representations of payees to pay bills). Executing operation 418 executes the transaction specified by the user via the virtual reality financial center.

Computer System Overview

Figure 5:
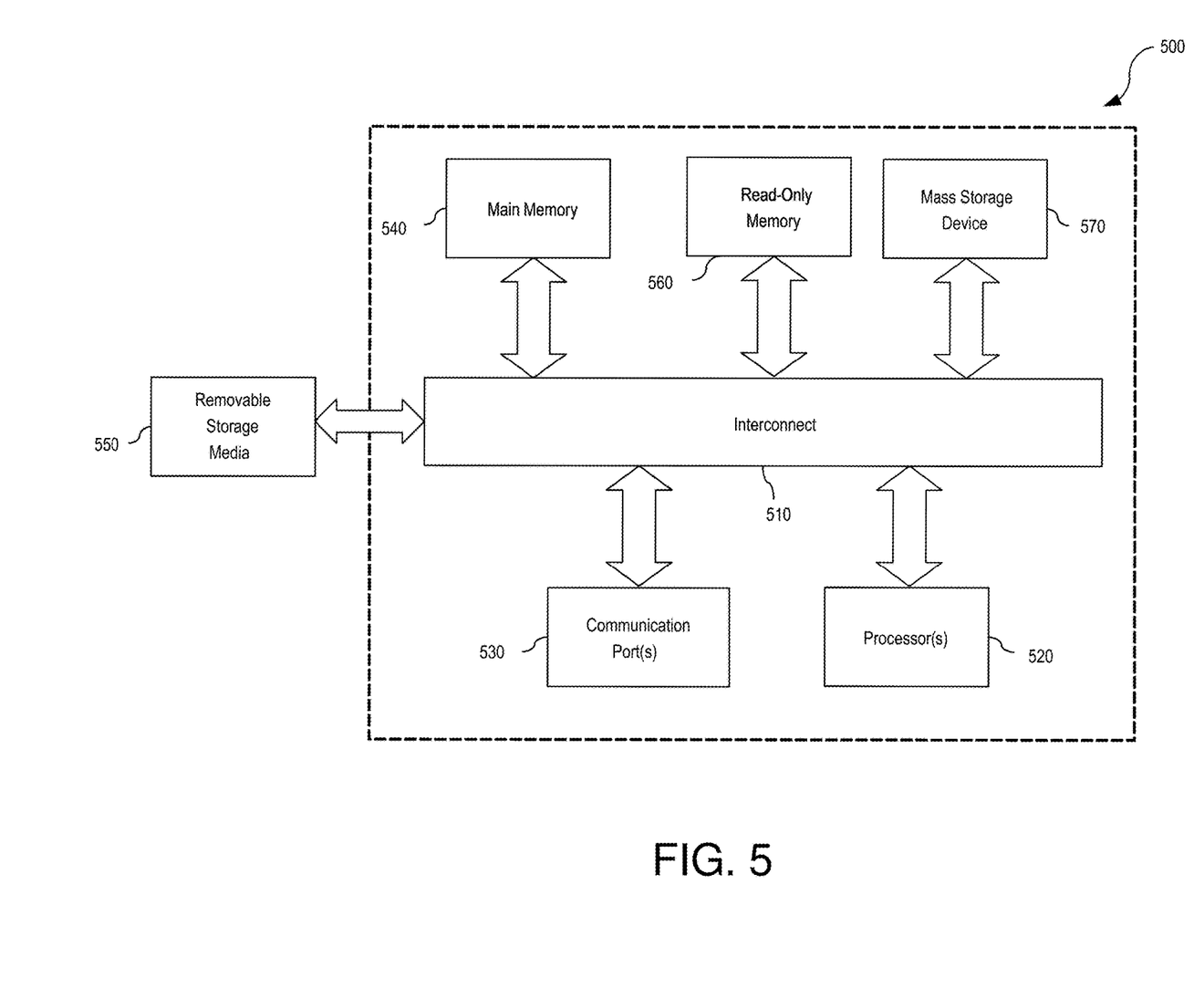
FIG. 5 illustrates an example of a computer system with which some embodiments of the present disclosure may be used.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 5 is an example of a computer system 500 with which embodiments of the present disclosure may be utilized. According to the present example, the computer system 500 includes an interconnect 510, at least one processor 520, at least one communication port 530, a main memory 540, a removable storage media 550, a read-only memory 560, and a mass storage device 570.

Processor(s) 520 can be any known processor, such as, but not limited to, an Intel® Itanium® or Itanium 2® processor(s), or AMD® Opteron® or Athlon MP® processor(s), or Motorola® lines of processors. Communication port(s) 530 can be a RS-232 port for use with a modem-based dial-up connection, a 10/100 Ethernet port, or a Gigabit port using copper or fiber. Communication port(s) 530 may be chosen depending on the type of network such as a Local Area Network (LAN), Wide Area Network (WAN), or any network to which the computer system 500 connects.

Main memory 540 can be random access memory (RAM) or any other dynamic storage device(s) commonly known in the art. Read-only memory 560 can be any static storage device(s) such as programmable read-only memory (PROM) chips for storing static information, such as instructions for processor(s) 520.

Mass storage device 570 can be used to store information and instructions. Mass storage devices that may be used include hard disks such as the Adaptec® family of SCSI (small computer system interface) drives, optical discs, an array of discs such as RAID (redundant array of independent disks), the Adaptec® family of RAID drives, or any other mass storage device.

Interconnect 510 communicatively couples processor(s) 520 with the other memory, storage, and communication blocks. Depending on the storage devices used, interconnect 510 can be a PCI/PCI-X- or SCSI-based system bus.

Removable storage media 550 can be any type of external hard drive, floppy drive, IOMEGA® Zip Drives, compact disc read-only memory (CD-ROM), compact disc re-writable (CD-RW), and/or digital video disc read-only memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which a connection or a coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" encompasses being completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules; or a module can include one or more application programs.

The term "network" generally refers to a group of interconnected devices capable of exchanging information. A network may be as small as several personal computers on a local area network (LAN) or as large as the Internet, a worldwide network of computers. As used herein, "network" is intended to encompass any network capable of transmitting information from one entity to another. In some cases, a network may comprise multiple networks—even multiple heterogeneous networks—such as one or more border networks, voice networks, broadband networks, financial networks, service provider networks, Internet service provider (ISP) networks, and/or public switched telephone networks (PSTNs) interconnected via gateways operable to facilitate communications between and among the various networks.

Also, for the sake of illustration, various embodiments of the present disclosure have herein been described in the context of computer programs, physical components, and logical interactions within modern computer networks. More importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead, are meant to be examples. Other systems, devices, and networks to which embodiments of the present disclosure are applicable include, but are not limited to, other types of communication and computer devices and systems. More specifically, embodiments are applicable to communication systems, services, and devices, such as cell phone networks and compatible devices. In addition, embodiments are applicable to all levels of computing, from the personal computer to large network mainframes and servers.

In conclusion, the present disclosure discloses novel systems, methods, and arrangements for authenticating a user in a virtual reality environment. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments that have different combinations of features and embodiments that do not include all of the described features. Accordingly, the scope of the present disclosure is intended to embrace all such alternatives, modifications, and variations that fall within the scope of the claims, together with all equivalents thereof. Therefore, the above description should not be taken as limiting.

What is claimed is:

1. A method comprising:
    receiving, at a virtual reality platform associated with an enterprise, a request to enter a virtual reality financial center requiring identification information and verification information from a user, wherein the virtual reality financial center allows the user to transfer funds within the virtual reality financial center;
    identifying, via a virtual reality device connected to the virtual reality platform, an identity of the user based on biometric information of the user;
    displaying, via the virtual reality device, two or more virtual objects in a 3D virtual reality environment for the user to arrange in an order to provide an authentication credential to verify the identity of the user;
detecting, via the virtual reality device, at least one hand of the user in 3D virtual reality environment;
monitoring, via the virtual reality device, the user arranging the two or more virtual objects with the at least one hand in the 3D virtual reality environment;
verifying the identity of the user based on the user arranging the two or more virtual objects, in the 3D virtual reality environment, in the order to provide the authentication credential; and
in response to identifying and verifying the identity of the user, authenticating, by the virtual reality platform, the user to access, via the virtual reality device, the virtual reality financial center.

2. The method of claim 1, wherein the authentication credential is selected by the user.

3. The method of claim 1, wherein the method further comprises randomizing a display of the two or more virtual objects prior to displaying the two or more virtual objects.

4. The method of claim 1, wherein the two or more virtual objects are die, wherein the authentication credential comprises faces of the two or more die to match a pre-established authentication credential associated with the user.

5. The method of claim 4, further comprising randomizing a display of the faces of the two or more die prior to displaying the two or more die.

6. The method of claim 4, wherein the pre-established authentication credential is a personal identification number used to authenticate the user to a website or to a mobile application, and wherein the identification information comprises at least one of a token or location information.

7. The method of claim 1, wherein the verification information comprises biometric information received via a camera integrated with a headset associated with the virtual reality platform.

8. The method of claim 1, wherein the method further comprises:
displaying on an external device the virtual reality financial center; and
disabling the display of the virtual reality financial center while the virtual reality platform is collecting the verification information.

9. The method of claim 1, wherein the method further comprises causing the virtual reality platform to display a visual representation of one or more accounts of the user in stacks of currency or precious metals.

10. The method of claim 9, wherein the method further comprises:
receiving movement of the currency from a first stack to a second stack; and
transferring an amount of funds equivalent to the moved currency from a first bank account corresponding to the first stack to a second bank account corresponding to the second stack.

11. A system for a virtual reality platform, the system comprising:
one or more processors; and
a computer-readable storage medium having instructions stored thereon, which when executed by the one or more processors cause the system to:
receive a request for access to a virtual reality financial center requiring identification information and verification information from a user;
identify, via a virtual reality device connected to the virtual reality platform, an identity of the user based on biometric information of the user;
display, via the virtual reality device, two or more virtual objects in a 3D virtual reality environment for the user to arrange in an order to provide an authentication credential to verify the identity of the user;
detect, via the virtual reality device, at least one hand of the user in 3D virtual reality environment;
monitor, via the virtual reality device, the user arranging the two or more virtual objects with the at least one hand in the 3D virtual reality environment;
verify the identity of the user based on the user arranging the two or more virtual objects, in the 3D virtual reality environment, in the order to provide the authentication credential; and
in response to identifying and verifying the identity of the user, authenticate the user to access, via the virtual reality device, the virtual reality financial center.

12. The system of claim 11, wherein the instructions, when executed by the one or more processors, further cause the system to randomize a display of the two or more virtual objects prior to displaying the two or more virtual objects.

13. The system of claim 11, wherein the two or more virtual objects are die, wherein the authentication credential comprises faces of the two or more die to match a pre-established authentication credential associated with the user.

14. The system of claim 13, wherein the instructions, when executed by the one or more processors, further cause the system to randomize a display of the faces of the two or more die prior to displaying the two or more die.

15. The system of claim 13, wherein the pre-established authentication credential is a personal identification number used to authenticate the user to a website or to a mobile application.

16. The system of claim 11, wherein the verification information comprises biometric information received via a camera integrated with a headset associated with the virtual reality platform.

17. The system of claim 11, wherein the identification information comprises at least one of a token or location information.

18. The system of claim 11, wherein the instructions, when executed by the one or more processors, further cause the system to display a visual representation of one or more accounts of the user in stacks of currency or precious metals.

19. The system of claim 18, wherein the instructions, when executed by the one or more processors, further cause the system to:
receive movement of the currency from a first stack to a second stack; and
transfer an amount of funds equivalent to the moved currency from a first bank account corresponding to the first stack to a second bank account corresponding to the second stack.

20. A computer-readable storage medium storing instructions that, when executed by a computing system, cause the computing system to perform a process comprising:
receiving, at a virtual reality platform associated with an enterprise, a request to enter a virtual reality financial center requiring identification information and verification information from a user, wherein the virtual reality financial center allows the user to transfer funds within the virtual reality financial center;
identifying, via a virtual reality device connected to the virtual reality platform, an identity of the user based on biometric information of the user;

displaying, via the virtual reality device, two or more virtual objects in a 3D virtual reality environment for the user to arrange in an order to provide an authentication credential to verify the identity of the user;

detecting, via the virtual reality device, at least one hand of the user in 3D virtual reality environment;

monitoring, via the virtual reality device, the user arranging the two or more virtual objects with the at least one hand in the 3D virtual reality environment;

verifying the identity of the user based on the user arranging the two or more virtual objects, in the 3D virtual reality environment, in the order to provide the authentication credential; and in response to identifying and verifying the identity of the user, authenticating, by the virtual reality platform, the user to access, via the virtual reality device, the virtual reality financial center.

\* \* \* \* \*